US012394982B2

(12) United States Patent
Ilic et al.

(10) Patent No.: US 12,394,982 B2
(45) Date of Patent: Aug. 19, 2025

(54) POWER SUPPLY SYSTEM FOR AN ELECTROCHEMICAL STACK (71) Applicant: ELECTRIC HYDROGEN CO., Natick, MA (US)

(72) Inventors: Milan Ilic, San Jose, CA (US); Raffi Garabedian, Los Altos, CA (US)

(73) Assignee: ELECTRIC HYDROGEN CO., Devens, MA (US)

( * ) Notice: Subject to any disclaimer, the term of this patent is extended or adjusted under 35 U.S.C. 154(b) by 0 days.

(21) Appl. No.: 18/685,392

(22) PCT Filed: Dec. 22, 2022

(86) PCT No.: PCT/US2022/053844
§ 371 (c)(1),
(2) Date: Feb. 21, 2024

(87) PCT Pub. No.: WO2023/129480
PCT Pub. Date: Jul. 6, 2023

(65) Prior Publication Data
US 2024/0266832 A1 Aug. 8, 2024

Related U.S. Application Data (60) Provisional application No. 63/293,868, filed on Dec. 27, 2021.

(51) Int. Cl.
*H02J 3/14* (2006.01)
*H02J 3/38* (2006.01)
*H02J 15/00* (2006.01)

(52) U.S. Cl.
CPC .............. *H02J 3/144* (2020.01); *H02J 3/381* (2013.01); *H02J 15/008* (2020.01);
(Continued)

(58) Field of Classification Search
CPC .............. H02J 2300/40; H02J 2300/24; H02J 2300/28; H02J 3/144; H02J 15/008; H02J 3/381
See application file for complete search history.

(56) References Cited

U.S. PATENT DOCUMENTS

| 7,645,931 | B2 * | 1/2010 | Gibson ................ C25B 1/04 363/79 |
| 11,782,399 | B1 * | 10/2023 | Buttgenbach .......... G05B 13/04 700/287 |
| 2005/0084745 | A1 | 4/2005 | Colello et al. |

(Continued)

FOREIGN PATENT DOCUMENTS

| CA | 2734671 A1 * | 9/2011 | .............. H02J 3/385 |
| CN | 117410958 A * | 1/2024 | |

(Continued)

OTHER PUBLICATIONS

International Search Report and Written Opinion for PCT/US2022/053844, dated Mar. 27, 2023, pp. 1-8.
(Continued)

*Primary Examiner* — Thienvu V Tran
*Assistant Examiner* — Yahveh Comas Torres
(74) *Attorney, Agent, or Firm* — Lempia Summerfield Katz LLC (57) ABSTRACT A system includes a power supply for an electrochemical stack. The system may support operation in at least two modes: a first where power for the electrochemical stack originates from a renewable energy (e.g., an on-site) power source, and a second mode where power for the electrochemical stack is supplied at least in part from a power grid interconnection. A source power converter may adjust its operating voltage to select between prioritizing power from the on-site source and/or drawing power from the electrochemical stack at least in part from the power grid.

17 Claims, 3 Drawing Sheets (52) U.S. Cl.
CPC ....... *H02J 2300/24* (2020.01); *H02J 2300/28* (2020.01); *H02J 2300/40* (2020.01)

(56) References Cited

U.S. PATENT DOCUMENTS

| | | | | |
|---|---|---|---|---|
| 2006/0192435 | A1* | 8/2006 | Parmley | H02J 1/10 |
| | | | | 700/286 |
| 2008/0067869 | A1 | 3/2008 | Evans et al. | |
| 2008/0236647 | A1* | 10/2008 | Gibson | C25B 15/00 |
| | | | | 136/244 |
| 2010/0001587 | A1* | 1/2010 | Casey | H01L 31/02021 |
| | | | | 136/244 |
| 2011/0006600 | A1* | 1/2011 | Fontana | H02J 1/10 |
| | | | | 361/679.01 |
| 2011/0232714 | A1* | 9/2011 | Bhavaraju | H02J 3/381 |
| | | | | 307/82 |
| 2012/0161527 | A1* | 6/2012 | Casey | H02J 3/381 |
| | | | | 307/80 |
| 2018/0123348 | A1 | 5/2018 | Narla | |
| 2019/0052092 | A1* | 2/2019 | Palombini | H02J 3/32 |

FOREIGN PATENT DOCUMENTS

| | | | | |
|---|---|---|---|---|
| DE | 102016013048 A1 * | 5/2018 | ............ | H01M 10/48 |
| EP | 1975279 A1 * | 10/2008 | ............... | C25B 1/04 |
| EP | 3691081 A1 * | 8/2020 | ............... | C25B 9/04 |
| WO | WO-2021122205 A1 * | 6/2021 | ........ | H01M 8/04186 |

OTHER PUBLICATIONS

Extended European Search Report for European Patent Application No. 22917247.3, mailed Apr. 24, 2025 (8 pages).

* cited by examiner

POWER SUPPLY SYSTEM FOR AN ELECTROCHEMICAL STACK

This application is a § 371 nationalization of PCT Application Serial No. PCT/US2022/053844, filed Dec. 22, 2022, designating the United States, which claims the benefit of U.S. Provisional Application No. 63/293,868, filed Dec. 27, 2021, and entitled "Power Supply System for an Electrochemical Stack," which are hereby incorporated by reference in their entireties.

FIELD

The following disclosure relates to a power supply system for an electrochemical stack.

BACKGROUND

Electrolyzer systems use electrical energy to drive a chemical reaction. For example, water is split to form hydrogen and oxygen. The products may be used as energy sources for later use. In recent years, improvements in operational efficiency have made electrolyzer systems competitive market solutions for energy storage, generation, and/or transport. For example, the cost of generation may be below $10 per kilogram of hydrogen in some cases. Increases in efficiency and/or improvements in operation will continue to drive installation of electrolyzer systems.

BRIEF DESCRIPTION OF THE DRAWINGS

Example implementations are described herein with reference to the following drawings.

DETAILED DESCRIPTION

The discussed architectures and techniques may support large-scale (and/or other scale) electrolysis systems directly or virtually connected to a renewable generation energy source, and/or electrolysis systems providing grid services. Everything described here can also be applied to electrochemical processes other than electrolysis, for example electrochemical reduction of oxide ores, chloralkali processes and the like, so long as they are powered by resources utilizing a power converter.

In some cases, it may be desirable to at least in part power an electrochemical plant (or one or more individual stacks) using an on-site power source, e.g., such as a solar plant, windfarm, fuel cell array, or other on-site power source and/or power generation source. In some cases, it may also be desirable to at least in part power the same electrochemical stacks using grid power when on-site power is unavailable or otherwise insufficient.

According to the conventional wisdom, the on-site power source could be connected to the grid (and consequently regulated thereby) such that power could be directed to the electrochemical stack from the source when available and from the grid when insufficient. Thus, the electrochemical stack would operate the same way regardless of whether grid power or on-site power was supplied to the electrochemical stack. Further, this conventional wisdom method allows for switching between on-site power and grid power seamlessly. According to the conventional wisdom, this grid interconnection method provides for switching between on-site power and grid power without requiring power downs to switch between sources that may reduce equipment life and increase overall down time.

Although unrecognized by the conventional wisdom, grid specifications may require components that may add to the cost and increase losses of the on-site power source, but these same components may not be necessary to the operation of the electrochemical stack. Accordingly, grid interconnection may increase costs and reduce efficiency of on-site power sources. This unrecognized problem may be solved through methods that provide seamless switching (to avoid power downs) but that do not necessarily require grid interconnection. Nevertheless, grid interconnection may be included for power capture from the on-site source in cases where power unused by the electrochemical stack may be recaptured for provision to the grid. For example, the grid interconnect may include a rectifier and/or inductor to adapt power from the grid to power for use by the electrochemical stack. In some cases, the rectifier and/or inductor may be supplanted or supplemented by an active power factor circuit, which can operate in bi-directional mode.

The architectures and techniques discussed herein provide seamless power switching between grid and on-site sources without necessarily requiring interconnect between the grid and the on-site source.

Figure 1:
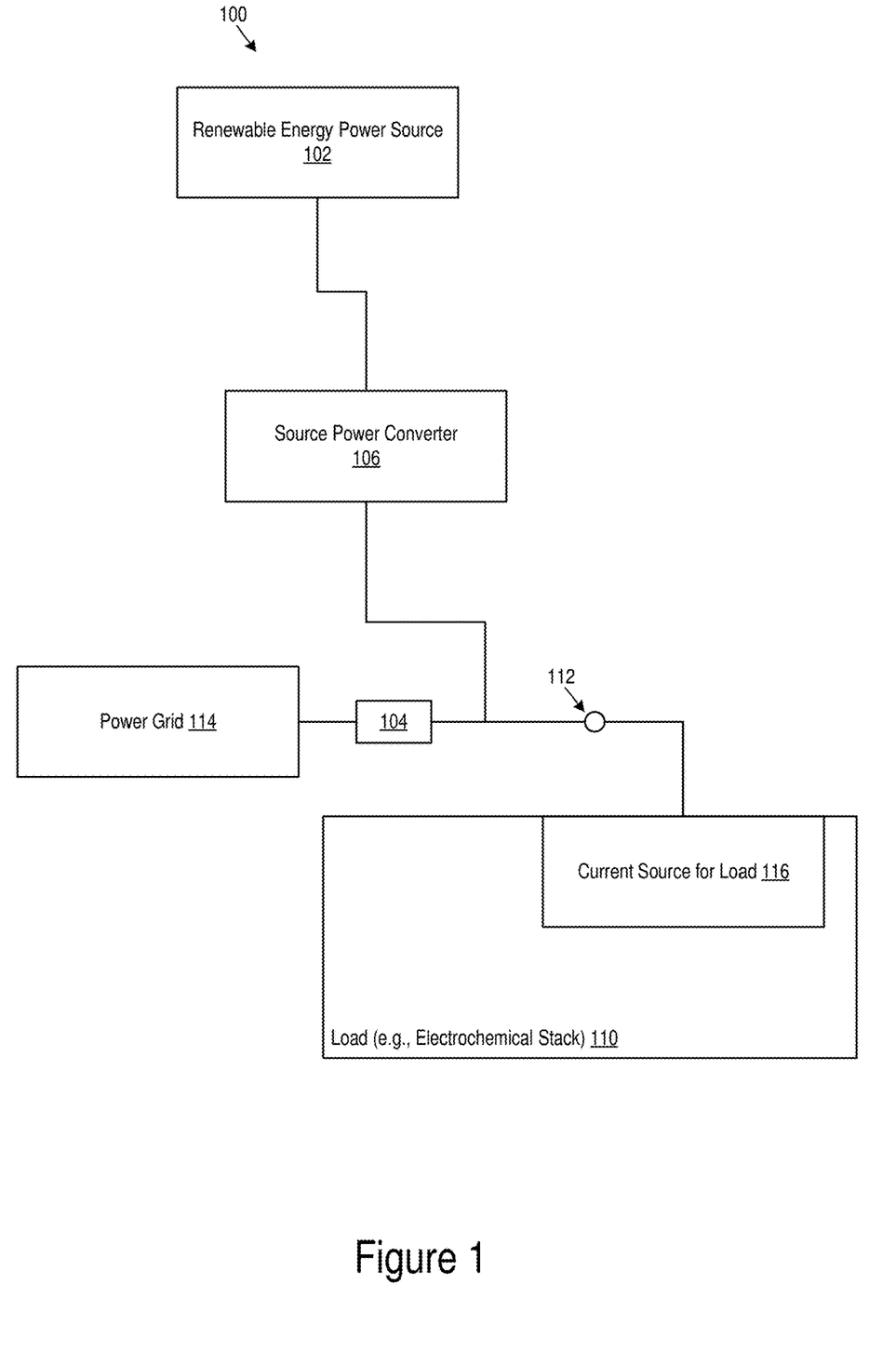
FIG. 1 shows an example power supply system for an electrochemical stack.

FIG. 1 shows an example power supply system 100 configured to supply power to a load 110. In an example, the load 110 may be an electrochemical stack, and the load 110 is sometimes referred to herein as "electrochemical stack" 110. The electrochemical stack 110 may include one or more electrolyzer stacks, for example. In other examples, the power supply system 100 may be configured to supply power to suitable loads other than an electrochemical stack.

The power supply system 100 may include a renewable energy power source 102 that may be coupled to a source power converter 106. The renewable energy power source 102 may be a dedicated on-site power source or an off-site power source. The renewable energy power source 102 may include one or more of a solar plant, windfarm, fuel cell array, or other on-site power source and/or power generation source, for example. The power supply system 100 may also include a power grid connection block 104 that may be input coupled to a power grid 114 and output coupled via a port 112 to the electrochemical stack 110 (e.g., to a power port of the electrochemical stack 110).

The source power converter 106 may be input coupled to the renewable energy power source 102 and output coupled to the port 112 in parallel with the power grid connection block 104. The source power converter 106 may be configured to convert a direct current (DC) power (e.g., DC voltage) output by the renewable energy power source 102 to a DC power (e.g., DC voltage) suitable for operation of the electrochemical stack 110. The source power converter 106 may thus include a DC/DC power converter, such as a boost converter or other power converter. In other examples, the source power converter 106 may additionally or alternatively include another type of power converter, such as an alternating current (AC) to DC power converter, a DC to AC power converter, or an AC to AC power converter, for example.

In various implementations, the power grid connection block 104 may include a rectifier and/or inductor to support adaptation of power from the power grid 114. Further, the electrochemical stack 110 may include a power converter (e.g., a current source) 116 coupled to the port 112 and configured to adapt power from the source power converter 106 and power drawn from the power grid connection block 104 to a format selected for operation of the electrochemical stack 110.

In an example, the source power converter 106 may be configured to operate in at least two modes corresponding to at least two different power states. A first mode of the source power converter 106 may correspond to a first power state in which power required by the electrochemical stack 110 originates from the renewable energy power source 102. The first mode may be utilized, for example, when sufficient amount of power to run the electromechanical stack 110 can be obtained from the renewable energy power source 102. In an example, in the first power state, no power from the power grid 114 is provided to the electrochemical stack 110. A second mode of the source power converter 106 may correspond to a second power state in which at least some power required by the electrochemical stack 110 originates from the power grid 114. In an example, in the second power state, the renewable energy power source 102 cannot provide sufficient power to run the electrochemical stack 110, and some or all of the power required to run the electrochemical stack 110 may be supplied from the power grid 114.

In various examples, if sufficient power to run the electrochemical stack 110 is available from the renewable energy power source 102, then the power is supplied to the electrochemical stack 110 only from the electrochemical stack 110. On the other hand, if sufficient power to run the electrochemical stack 110 is not available from the renewable energy power source 102, then at least a portion of the power to the electrochemical stack 110 is supplied from the power grid 114. Accordingly, in an example, the first mode may be referred to as a "priority mode," the first power state may be referred to as a "priority power state," the second mode may be referred to as a "shared mode," and the second power state may be referred to as a "shared power state." In other examples, power to the electrochemical stack 110 may be provided from the renewable energy power source 102 and/or the power grid 114 in other suitable manners corresponding to other suitable power states.

In the first power state, the source power converter 106 may operate in the first mode to adjust its operating voltage (output) such that the power used to run the electrochemical stack originates from the renewable energy power source 102. In an example, when operating in the first mode, the source power converter 106 may regulate its output voltage level to a priority voltage that is higher than a grid rectified voltage. Regulating the output voltage of the source power converter 106 to a priority voltage that is higher than the grid rectified voltage may cause the electrochemical stack to be powered by the reviewable energy power source 102.

In the second power state, the source power converter 106 may operate in the second mode to adjust its operating voltage (output) such that the power used to run the electrochemical stack 110 is drawn (at least in part) from the power grid 114 through the power grid connection block 104. In an example, when operating in the second mode, the source power converter 106 may adjust its output voltage to a shared voltage, which is lower than the priority voltage, to cause the electrochemical stack 110 to be powered at least in part by grid power drawn through the power grid connection block 104 from the power grid 114. In an example, a level of the shared voltage is determined by power grid requirements, for example such that the shared voltage corresponds to the rectified grid voltage according to the power grid requirements. The amount of power drawn by the electrochemical stack 110 from the renewable energy power source 102 versus the power grid 114 may be determined via the relative level of current/power supplied by the two sources. In some cases, the renewable energy power source 102 may be maintained in a on state (even when supplying no or negligible power to the electrochemical stack) rather than be shut fully off to avoid spin-up delays associated with restarting the on-site power source.

It is noted that although the second mode may be referred to a "shared mode" and the second power state may be referred to as a "shared power state," in some cases of the second mode power required by the electrochemical stack 110 may be supplied entirely from the power grid, with no power supplied from the renewable energy power source 102. For example, the second mode may be utilized when no power is available from the renewable energy power source 102.

In some examples, suitable criteria other than the amount of power available from the renewable energy power source 102 and amount of power required to run the electrochemical stack 110 may be additionally or alternatively utilized to determine whether the source power converter 106 is to operate in the first mode corresponding to the first power state or the second mode corresponding to the second power state. For example, the determination may be made based at least in part on a current time (e.g., a current time of day), a cost (e.g., a current price of energy provided by the power grid 114 and/or a current cost of energy provided by the renewable energy power source 102) and/or other suitable criteria.

In an example, a processor or other controller (not shown) may be coupled to a control input of the source power converter 106, and the processor or other controller may be configured to determine a particular mode (e.g., the first mode or the second mode) in which the source power converter 106 is to operate and control the source power converter 106 to operate in the determined mode. In other examples, the source power converter 106 may operate in a particular mode (e.g., the first mode or the second mode) based on amount of power or voltage level at the input of the source power converter 106 coupled to the renewable energy power source 102 and power drawn by the electrochemical stack 110. In this case, no additional processor or controller for mode control of the source power converter 106 may be provided.

With continued reference to FIG. 1, the renewable energy power source 102 may be configured to supply power to the power grid 114 when the electrochemical stack 110 draws less power than that generated by the renewable energy power source 102. In some examples, the power grid connection block 104 may include an active power factor circuit configured to provide two-way power delivery. Power may thus be delivered from the power grid 114 to the electrochemical stack 110 via the power grid connection block 104, and power may be delivered from the renewable energy power source 102 to the power grid 114 via the power grid connection block 104.

In some examples, the source power converter 106 may include multiple power converters. One or more of the multiple power converters may be coupled to a solar cell string in a maximum power point tracking (MPPT) scheme, for example. Additionally or alternatively, one or more of the multiple power converters may be coupled to a turbine in an on-site windfarm. An example implementation with multiple power converters is described in more detail below in connection with FIG. 3.

Figure 2:
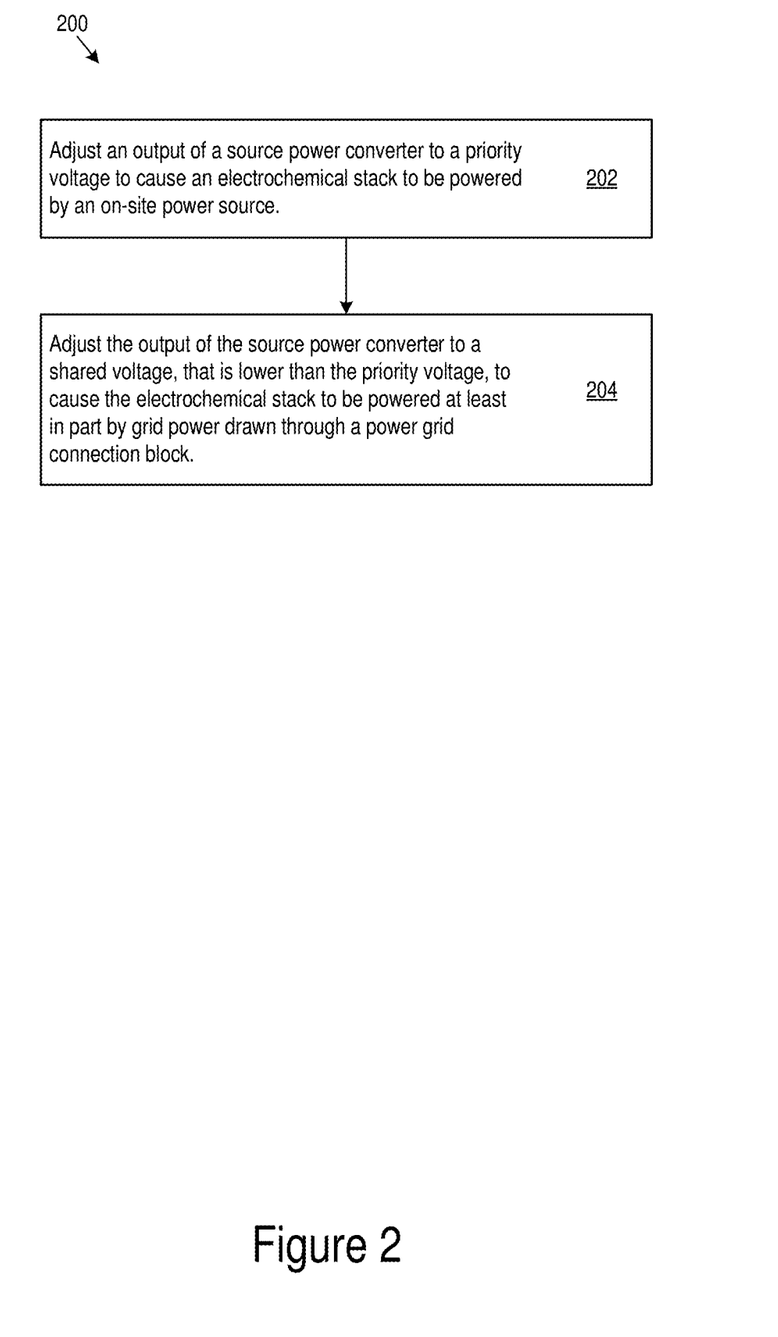
FIG. 2 shows example power supply logic.

FIG. 2 shows example power supply logic (PSL) 200, which may be used various power supply systems include the example power supply system 100. In some cases, the PSL 200 may be implemented on power supply circuitry. The PSL 200 may adjust an output of a source power converter to a priority voltage to cause an electrochemical stack to be powered by a renewable energy (e.g., on-site) power source (202). In some implementations, adjusting the operating voltage of the source power converter to power the electrochemical stack in the priority power state comprises adjusting the operating voltage of the source power converter to power the electrochemical stack in the priority power state when sufficient power to run the electrochemical stack is available from the renewable energy power source. The PSL 200 may adjust the output of the source power converter to a shared voltage, which is lower than the priority voltage, to cause the electrochemical stack to be powered at least in part by grid power drawn through a power grid connection block (204). In an example, adjusting the operating voltage of the source power converter to power the electrochemical stack in the shared power state comprises adjusting the operating voltage of the source power converter to power the electrochemical stack in the shared power state when sufficient power to run the electrochemical stack is not available from the renewable energy power source. When operating at the priority voltage, the increased voltage relative to the grid supplied voltage level with cause power to flow from the on-site power source instead of the grid. When operating at the shared voltage, the equal voltage between the grid supplied voltage level and the shared voltage with cause power to flow from the grid and the on-site power supply (as determined by their relative current levels.

Example Implementations

Various illustrative example implementations are discussed below. The illustrative example implementations are illustrative of the general architectures and techniques described above and in the claims below. Designations of particular features such as "key," "critical," "important," "must," and/or other similar designations are included to clarify the relationship of that particular feature to the specific illustrative scenario/scenarios in which the particular feature is discussed. Such a relationship to the same degree may not apply without express description of such a relationship to other implementations. Nevertheless, such features described with respect to the individual example implementations may be readily integrated with other implementations with or without various other features present in the respective example implementation.

Figure 3:
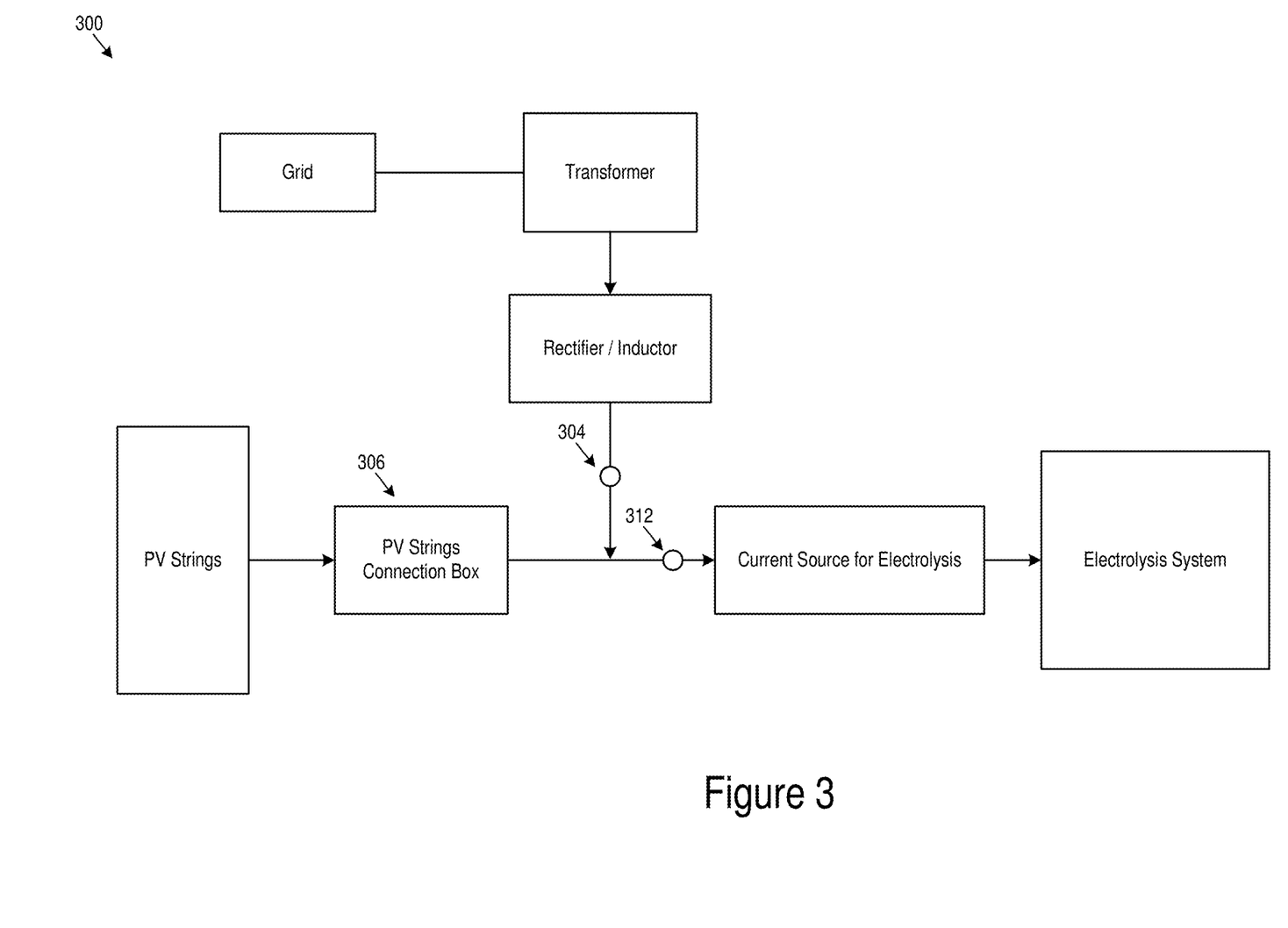
FIG. 3 shows an example power supply system for an electrolyzer stack.

FIG. 3 shows an illustrative example power supply system 300 for an electrolysis system. In this illustrative example, the current source for electrolysis (CSE) (e.g., behind an input port 312 for the electrolysis system) may be supped directly by solar energy and rest of energy may come from grid rectification through a connection input 304. Solar power (e.g., photovoltaic (PV) strings) is discussed for the purposes of example, but other renewable energy (e.g., on-site) power sources may be used. In this configuration photovoltaic strings connection block (PVCB, 306 which may be a source power converter, e.g., as DC-DC power converter) may be smart in order to adjust its output operating voltages to enforce the power mode selection and provide MPPT (maximum power point tracking) function for PV string. The PVCB 306 may be the same as or similar to the source power converter 106 of FIG. 1 and/or may operate in a manner the same as or similar to the source power converter 106 as described above with reference to FIG. 1.

There may be at least two operating conditions for the power supply system 300:
1) On-site power only (e.g., corresponding to the first mode of the source power converter 106 of FIG. 1): The CSE and/or PVCB will regulate bus voltage level to a priority voltage which is higher than grid rectified voltage (e.g., the shared voltage) at the connection input 304.
2) At least some grid power (e.g., corresponding to the second mode of the source power converter 106 of FIG. 1): The CSE and/or PVCB will regulate bus voltage to level to a shared voltage level (which is in this case is equal to the voltage level of the grid, $V_{gr}$). The amount of power drawn from the on-site power source versus the grid may be determined via the relative level of current/power supplied by the two sources. In some cases, the on-site power source may be maintained in an on state (even when supplying no or negligible power to the electrochemical stack) rather than be shut fully off to avoid spin-up delays associated with restarting the on-site power source.

In some cases, the PVCB 306 may include a DC/DC converter (such as boost converter or other power converter). In some cases, the PVCB 306 may include multiple power converters. For example, the multiple power converters may be individuals coupled to the photovoltaic cells at the string level and operated in an MPPT scheme.

Portions of the methods, devices, and systems, such as processing, and logic described above, may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry. Various example implementations have been included for illustration. Other implementations are possible.

Table 1 includes various examples.

TABLE 1

Examples

1. A system including:
an electrochemical stack including an input port;
an on-site power source;
a power grid connection block coupled to the input port;
a source power converter:
input-coupled to the on-site power source; and
output-coupled to the input port in parallel with the power grid connection block, where:
optionally, the source power converter is configured to adjust an operating voltage to:
operate in a priority power state where power to the electrochemical stack originates from the on-site power source; and
operate in a shared power state where the power to the electrochemical stack includes grid power drawn through the output port.
2. A method including:
for:
a power grid connection block coupled to an input port of an electrochemical stack; and
a source power converter:
input-coupled to an on-site power source; and
output-coupled to the input port of the electrochemical stack and in parallel with a power grid connection block;
adjusting an operating voltage of the source power converter to power the electrochemical stack in a priority power state where power to the electrochemical stack originates from the on-site power source; and
adjusting the operating voltage of the source power converter to power the electrochemical stack in a shared power state where the power to the electrochemical stack includes grid power drawn through the output port.
3. A method including:
adjusting an output of a source power converter to a priority voltage to cause an electrochemical stack to be powered by an on-site power source;
adjusting the output of the source power converter to a shared voltage, which is lower than the priority voltage, to cause the electrochemical stack to be powered at least in part by grid power drawn through a power grid connection block, where:
optionally, the method is performed using the system of any of the other claims.
4. The system or method of any of the other examples in this table, where the source power converter includes multiple power converters, where:
optionally, one or more of the multiple power converters is coupled to a solar cell string, for example in a maximum power point tracking (MPPT) scheme;
optionally, one or more of the multiple power converters is coupled to a turbine in an on-site windfarm; and
optionally, the on-site power source includes a solar plant, a windfarm, or a combined solar plant and windfarm.
5. The system or method of any of the other examples in this table, where the shared voltage includes a voltage level determined by power grid requirements.
6. The system or method of any of the other examples in this table, where the grid connection block includes an active power factor circuit for two-way power delivery, where:

TABLE 1-continued

Examples optionally, the on-site power source is configured to supply power to the grid when the electrochemical stack draws less power than that generated by the on-site power source.
7. The system or method of any of the other examples in this table, where the grid connection block includes a rectifier and/or inductor to adapt power for the electrochemical stack.
8. The system or method of any of the other examples in this table, where the electrochemical stack includes an electrolyzer stack, for example to produce hydrogen.
9. The system or method of any of the other examples in this table, where the input port of the electrochemical stack includes a current source (such as a power converter) to support operation of the electrochemical stack.
10. The device or method of any of the other examples in this table, where the shared voltage and/or priority voltage include:
optionally, a voltage greater than 100 v;
optionally, a voltage less than 500 v;
optionally, a voltage greater than 500 v;
optionally, a voltage less than 500 v;
optionally, a voltage greater than 1000 v;
optionally, a voltage less than 1000 v;
optionally, a voltage greater than 2 kv;
optionally, a voltage less than 5 kv;
optionally, a voltage greater than 5 kv;
optionally, a voltage less than 10 kv;
optionally, a voltage greater than 10 kv;
optionally, a voltage less than 20 kv;
optionally, a voltage greater than 20 kv;
optionally, a voltage less than 33 kv;
optionally, a voltage greater than 33 kv;
optionally, a voltage less than 50 kv;
optionally, a voltage greater than 50 kv;
optionally, a voltage less than 100 kv;
optionally, a voltage greater than 100 kv;
optionally, a voltage less than 300 kv; and
optionally, a voltage greater than 300 kv.

One or more implementations of the disclosure may be referred to herein, individually and/or collectively, by the term "invention" merely for convenience and without intending to voluntarily limit the scope of this application to any particular invention or inventive concept. Moreover, although specific implementations have been illustrated and described herein, it should be appreciated that any subsequent arrangement designed to achieve the same or similar purpose may be substituted for the specific implementations shown. This disclosure is intended to cover any and all subsequent adaptations or variations of various implementations. Combinations of the above implementations, and other implementations not specifically described herein, are apparent to those of skill in the art upon reviewing the description.

As used herein, the singular forms "a," "an," and "the" include plural referents unless the context clearly dictates otherwise.

As used herein, "for example," "for instance," "such as," or "including" are meant to introduce examples that further clarify more general subject matter. Unless otherwise expressly indicated, such examples are provided only as an aid for understanding implementations illustrated in the present disclosure and are not meant to be limiting in any fashion. Nor do these phrases indicate any kind of preference for the disclosed implementations.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single implementation for the purpose of streamlining the disclosure. This disclosure is not to be interpreted as reflecting an intention that the claimed imple-

The invention claimed is:

1. A system including:
   an electrochemical stack;
   a power grid connection block coupled to the electrochemical stack; and
   a source power converter that is input-coupled to a renewable energy power source, and output-coupled to the electrochemical stack in parallel with the power grid connection block,
   wherein the source power converter is configured to: (1) operate in a first mode corresponding to a first power state in which power to the electrochemical stack originates from the renewable energy power source; or (2) operate in a second mode corresponding to a second power state in which the power to the electrochemical stack comprises grid power drawn through an output port,
   wherein the source power converter is configured to, when operating in the first mode, adjust an output voltage of the power source converter to a priority voltage, which is higher than a grid rectified voltage, to cause the electrochemical stack to be powered by the renewable energy power source, and
   wherein the source power converter is configured to, when operating in the second mode, adjust the output voltage of the power source converter to a shared voltage, which is lower than the priority voltage, to cause the electrochemical stack to be powered at least in part by grid power drawn through the power grid connection block.

2. The system of claim 1, wherein the power grid connection block comprises a rectifier and/or inductor configured to adapt the power for the electrochemical stack.

3. The system of claim 1, wherein the shared voltage comprises a voltage level determined by power grid requirements.

4. The system of claim 1, wherein the source power converter is configured to:
   operate in the first mode when sufficient power to run the electrochemical stack is available from the renewable energy power source, and
   operate in the second mode when sufficient power to run the electrochemical stack is not available from the renewable energy power source.

5. The system of claim 1, wherein the renewable energy power source is configured to supply power to a power grid when the electrochemical stack draws less power than that generated by the renewable energy power source.

6. The system of claim 1, wherein the renewable energy power source comprises a solar plant, a windfarm, or a combined solar plant and windfarm.

7. The system of claim 1, wherein the source power converter comprises multiple power converters, and wherein one or more of the multiple power converters is coupled to: i) a solar cell string in a maximum power point tracking (MPPT) scheme; and/or ii) a turbine in an on-site windfarm.

8. The system of claim 1, wherein the electrochemical stack comprises a current source to support operation of the electrochemical stack.

9. The system of claim 1, wherein the power grid connection block includes comprises an active power factor circuit configured to provide two-way power delivery.

10. A method comprising:
    for: a power grid connection block coupled to an electrochemical stack; and a source power converter that is input-coupled to a renewable energy power source and output-coupled to the electrochemical stack in parallel with the power grid connection block;
    adjusting an operating voltage of the source power converter to power the electrochemical stack in a priority power state in which power to the electrochemical stack originates from the renewable energy power source, wherein the adjusting of the operating voltage of the source power converter to power the electrochemical stack in the priority power state comprises adjusting an output voltage of the power source converter to a priority voltage, which is higher than a grid rectified voltage, to cause the electrochemical stack to be powered by the renewable energy power source; and
    adjusting the operating voltage of the source power converter to power the electrochemical stack in a shared power state in which the power to the electrochemical stack comprises grid power drawn from a power grid through the power grid connection block.

11. The method of claim 10, wherein the adjusting of the operating voltage of the source power converter to power the electrochemical stack in the shared power state comprises adjusting the output voltage of the power source converter to a shared voltage, which is lower than the priority voltage, to cause the electrochemical stack to be powered at least in part by grid power drawn through the power grid connection block.

12. The method of claim 11, wherein the shared voltage comprises a voltage level determined by power grid requirements.

13. The method of claim 10, wherein the adjusting of the operating voltage of the source power converter to power the electrochemical stack in the priority power state comprises adjusting the operating voltage of the source power converter to power the electrochemical stack in the priority power state when sufficient power to run the electrochemical stack is available from the renewable energy power source, and
    wherein the adjusting of the operating voltage of the source power converter to power the electrochemical stack in the shared power state comprises adjusting the operating voltage of the source power converter to power the electrochemical stack in the shared power state when sufficient power to run the electrochemical stack is not available from the renewable energy power source.

14. The method of claim 10, further comprising:
    supplying power from the renewable energy power source to a power grid when the electrochemical stack draws less power than that generated by the renewable energy power source.

15. The method of claim 10, wherein the renewable energy power source comprises a solar plant, a windfarm, or a combined solar plant and windfarm.

16. The method of claim 10, wherein the source power converter comprises multiple power converters, and wherein one or more of the multiple power converters is coupled to i) a solar cell string in a maximum power point tracking (MPPT) scheme and/or ii) a turbine in an on-site windfarm.

17. The method of claim 10, wherein the electrochemical stack comprises one or more electrolyzer stacks.

* * * * *